United States Patent

Blum et al.

[11] Patent Number: 5,425,990
[45] Date of Patent: Jun. 20, 1995

[54] MATT-EFFECT, BIAXIALLY STRETCHED POLYPROPYLENE FILM AND A PROCESS FOR ITS PRODUCTION

[75] Inventors: Thomas Blum, Schwarmstedt; Ingo Schinkel, Walsrode; Anton Krallmann, Fallingbostel, all of Germany

[73] Assignee: Wolff Walsrode AG, Walsrode, Germany

[21] Appl. No.: 34,942

[22] Filed: Mar. 19, 1993

[30] Foreign Application Priority Data

Mar. 27, 1992 [DE] Germany .......... 42 09 918.8

[51] Int. Cl.[6] ............................................ D22B 27/00
[52] U.S. Cl. ...................................... 428/337; 428/500;
428/516; 428/910; 264/510; 264/291;
264/176.1; 156/244.11
[58] Field of Search ............... 428/500, 515, 337, 516;
156/244.11; 264/510, 176.1, 286.6, 291

[56] References Cited

U.S. PATENT DOCUMENTS

| 3,843,478 | 10/1974 | Zuscik . |
| 4,410,482 | 10/1983 | Subramanian .................. 264/515 |
| 4,522,887 | 6/1985 | Koebisu et al. . |
| 4,966,933 | 10/1990 | Kawakami et al. .............. 524/310 |

FOREIGN PATENT DOCUMENTS

| 0044544 | 1/1982 | European Pat. Off. . |
| 0053925 | 6/1982 | European Pat. Off. . |
| 0122495 | 10/1984 | European Pat. Off. . |
| 0353368 | 2/1990 | European Pat. Off. . |
| 0508415 | 10/1992 | European Pat. Off. . |

*Primary Examiner*—Edith Buffalow
*Attorney, Agent, or Firm*—Sprung Horn Kramer & Woods

[57] ABSTRACT

The invention relates to matt-effect multilayer polypropylene films which acquire their matt appearance from at least one-sided, coextruded layer of a polymer mixture.

5 Claims, 1 Drawing Sheet

MATT-EFFECT, BIAXIALLY STRETCHED POLYPROPYLENE FILM AND A PROCESS FOR ITS PRODUCTION

This invention relates to matt-effect multilayer polypropylene films which acquire their matt appearance from at least one coextruded layer of a polymer mixture on one side.

There are already a number of known biaxially stretched matt polypropylene films.

Thus, DE-A 3 231 013 specifically describes a polypropylene film having a rough surface which is produced by exposing the film to high-energy radiation before stretching.

JP 9 148 661 describes a process in which a rough surface is produced on a biaxially stretched polypropylene film by sandblasting or by a chemical etching process.

Increasing semi-opacity by addition of organic peroxides to propylene/ethylene block copolymers and to polyethylene-based copolymers is described in JP 2 103 214.

By contrast, 5 to 10% inorganic fillers, which are present over the entire thickness of an oriented polypropylene film, produce a rough surface according to DE-A 3 839 120.

A one-sided matt coating of inorganic and/or organic matting agent containing an ester resin which is applied from organic solvents is described in EP-A 262 953.

According to JP 8 038 157 and JP 3 129 264, rough surfaces are produced by $\alpha$- and $\beta$-spheroliths of polypropylene.

A number of patents describe matt films in which the matt effect is produced by block copolymers of propylene and ethylene or by mixing polypropylene homopolymers and/or copolymers with polyethylene.

JA 6 032 668 describes a non-glossy biaxial polypropylene film which consists over the entire thickness of the film of a blend of polypropylene with 10 to 65% polyethylene.

A multilayer film of low surface gloss is produced by laminating a monoaxially stretched polypropylene film with a mixture of propylene/ethylene copolymer and high-density polyethylene and subjecting the laminate to transverse stretching (JP 8 001 525).

EP-A 122 495 describes an at least two-layer biaxially stretched polypropylene film, in which at least one layer consists of a polyolefin containing 10 to 50% by weight ethylene. An ethylene/propylene block copolymer with three melting ranges between 120° and 160° C. is described as an example.

EP-A 44 544 describes a multilayer streched polypropylene film having a two-layer polypropylene structure to which a monoaxially or biaxially stretched propylene/ethylene block copolymer layer is additionally applied. In addition, the option of an additional adhesive layer is kept open.

A non-glossy laminated film produced by biaxial stretching of polypropylene containing 10 to 50% ethylene is described in JP 0 184 840.

JP 0 054 783 also describes a biaxially stretched film which has a rough surface produced by a propylene-/ethylene block copolymer.

Matt surfaces can also be obtained by laminating monoaxially stretched ethylene/propylene copolymers onto a biaxially stretched polypropylene film.

Processes for the production of biaxially stretched polypropylene films in some cases are extremely expensive or involve high investment costs (for example chemical etching processes, sandblasting, electron beam curing, lacquering). Other films do not meet market requirements in regard to the optical properties, sealability or printability of the matt layer. Accordingly, the problem addressed by the present invention on the one hand was to satisfy market requirements and, on the other hand, to produce a matt film using existing plant with the co-extrusion units present for biaxially stretched polypropylene.

Figure 1:
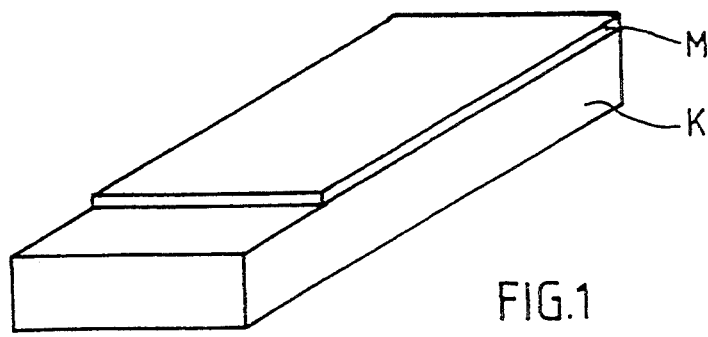
FIG. 1 depicts a biaxially stretched propylene film having an outer matt layer M and a core layer K.
Figure 2:
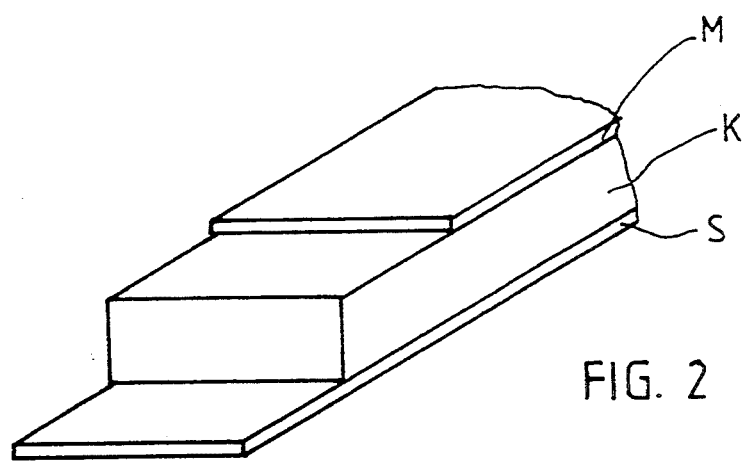
FIG. 2 depicts a biaxially stretched propylene film having an outer matt layer M, a core layer K and an other layer S which adjoins the opposite side of the matt layer.
Figure 3:
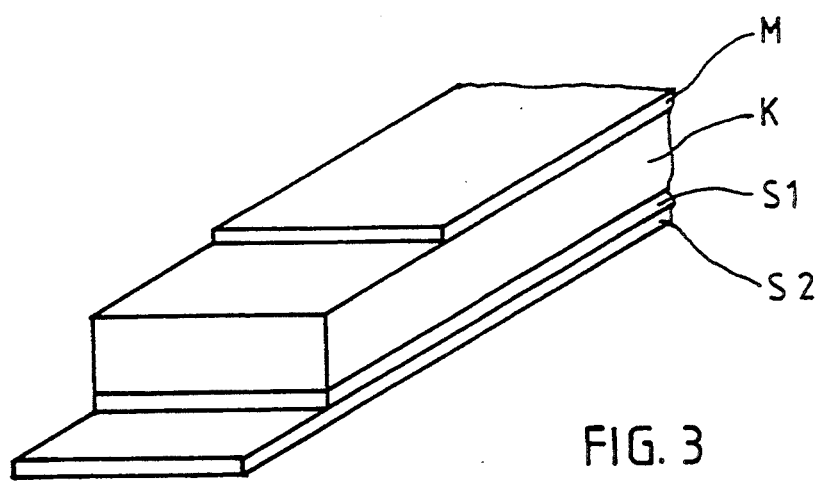
FIG. 3 depicts a biaxially stretched propylene film having an outer matt layer M, a core layer K and two other layers, $S_1$ and $S_2$, which adjoin the opposite side of the matt layer.

The present invention relates to matt-effect, two-layer or multilayer, biaxially stretched polypropylene films of an outer matt layer M, a core layer K and, optionally, other layers S which adjoin the opposite side of the matt layer and to polymer mixtures from which the matt layer can be produced, characterized in that the matt layer M has a thickness of 0.5 to 5.0 μm and is at least made up of

- 30 to 70% of one or more polypropylene/polyethylene block copolymers,
- 2 to 18% of an ethylene-based copolymer or terpolymer modified with polar groups,
- 68 to 2% of a statistical copolymer and/or terpolymer made up of propylene/ethylene/butylene with propylene as the principal component,
- 0 to 5% of a polyamide,
- 0 to 5% of a natural or synthetic silica, the components mentioned above being used in the form as supplied and/or in the form of batches thereof, in that the core layer K consists of a thermoplastic polymer and/or copolymer of propylene which may be supplied with typical slip, antistatic and/or antiblocking agents, and in that the layers S which adjoin the core layer K on the opposite side of the matt layer consist either of a thermoplastic polypropylene which may be supplied with typical slip, antistatic and/or antiblocking agents and/or of a thermoplastic statistical copolymer of polypropylene with one or more α-olefins containing 2 to 6 carbon atoms which may be supplied with typical slip, antistatic and/or antiblocking agents or of a hot-laminatable layer of mixtures of ethylene-based copolymers or of a layer combination of the above-mentioned layers S.

The following starting materials may be used for the matt layer M:

1. Polypropylene copolymers produced from propylene and α-olefins, preferably ethylene, by block polymerization (Solvay information) or heterophase copolymers of ethylene and propylene (polypropylene, Moplen®, Himont information) or rubber-modified polypropylene or polypropylene block copolymers and reactor blends (Dr. Harold Schwager, "Novolen®-Block-Copolymere und Reaktorblends" in "Fachtagung Novolen® für Spritzguβ und Extrusion ", BASF, Ludwigshafen 1991).

2. Linear low-density ethylene copolymers which are modified and/or low-density polyethylenes which are rubber-modified and which have an anhydride functionality and/or terpolymers of ethylene with acrylates and maleic anhydride.
3. Statistical propylene/ethylene copolymers containing 2 to 6% by weight ethylene or statistical terpolymers of propylene, ethylene and butylene with a comonomer content of <15% by weight and a butylene content of <7% by weight.
4. Polyamide 12 and/or polyamide 6 and/or polyamide 6.6 and/or polyamide 6.12 and/or polyamides containing aliphatic, cycloaliphatic and aromatic basic units.
5. Synthetic and/or natural silica/$SiO_2$ particles having a particle size of <10 μm.

The following starting materials are used for the core layer K:

An isotactic polypropylene having an n-heptane-soluble content of 15% by weight or less, a density of 0.90 to 0.91 g/cm$^3$ and a melt flow index of 0.5 g/10 mins. to 8 g/10 mins. at 230° C./21.2 N load (as determined in accordance with DIN 53 735), a polypropylene having a melt flow index of 1 to 4 g/10 mins. being particularly preferred, and/or
a statistical propylene/ethylene copolymer containing 2 to 6% by weight ethylene and having a density of preferably 0.895 to 0.960 g/cm$^3$, a melt index of 1 to 7 g/10 mins. at 230° C./21.2 N load and a crystallite melting point according to type in the range from 125° to 148° C. (under a polarization microscope) and/or
a propylene/butylene/ethylene copolymer having a comonomer content of preferably <15% by weight and a butylene content of preferably <7% by weight and, preferably, melt flow indices of 0.1 to 16 g/10 mins. at 230° C./21.2 N load and, more preferably, in the range from 4 to 10 g/10 mins. at 230° C./21.2 N.

The following starting materials are used for the layers S:

isotactic polypropylene and/or statistical copolymers and/or terpolymers which are also used as starting materials for the core layer and/or
a mixture thermolamination which, in the preferred embodiment, consists of ethylene/vinyl acetate copolymers A and at least one other copolymer from the group of ethylene/ethyl acrylate copolymers B1 or the group of ethylene/acrylic acid copolymers B2.

In a preferred embodiment, the ethylene/vinyl acetate copolymer A) contains 70 to 95% by weight and, more particularly, 75 to 95% by weight polymerized ethylene units; in a particularly preferred embodiment, the rest consists essentially or completely of polymerized vinyl acetate.

In a preferred embodiment, the ethylene/ethyl acrylate copolymer B1) essentially contains polymerized ethylene units, more particularly at least 88% by weight polymerized ethylene units, more particularly 88 to 92% by weight polymerized polyethylene units, the rest consisting essentially or completely of polymerized ethyl acrylate.

In a preferred embodiment, the ethylene/acrylic acid copolymer B2) consists essentially of polymerized ethylene units, more particularly at least 85% by weight polymerized ethylene units and in a particularly preferred embodiment, of 85 to 95% by weight polymerized ethylene units, the remainder consisting essentially or completely of polymerized acrylic acid.

The ethylene/vinyl acetate copolymer A preferably has a melt flow index of 0.1 to 15 g/10 mins. at 230° C./21.2 N and, more preferably, in the range from 0.3 to 8 g/10 mins. at 230° C./21.2 N.

The present invention also relates to a process for the production of the films described above, characterized in that a two- to three-layer film is co-extruded in known manner. After leaving the flat film die, the co-extruded film is cooled in such a way the matt layer undergoes slow cooling. The film is then reheated to approx. 100° to 130° C. and is longitudinally stretched in a ratio of 3 to 7 and preferably 4 to 5:1. After longitudinal stretching, the film is transversely stretched in a ratio of 7 to 12 and preferably 8 to 9:1 at temperatures of 150° to 170° C. Before leaving the stretching tunnel, the film is heat-set. Before winding into rolls, it is subjected on at least one side either to a corona discharge or to a flame pretreatment.

An alternative or supplement to the above-described process for the production of a three- to four-layer film is the two- or three-layer co-extrusion of the matt layer M, the core layer K and, if necessary, a layer S which are first longitudinally stretched as described above. Between leaving the longitudinal stretching zone and entering the transverse stretching zone, the film is laminated or extruded with another layer S, as described in EP 0 424 761 A2. After this layer has been applied, the film laminate is transversely stretched in a ratio of 1:7 to 1:12 and preferably in a ratio of 1:8.5 to 1:9.5 and is then subjected in the usual way to heat setting and corona treatment or flame pretreatment.

It was surprising to the expert to find that, by adding an ethylene-based copolymer or terpolymer modified with polar groups in the concentration ranges indicated to mixtures of block copolymers with random copolymers and, optionally, polyamides and $SiO_2$, the matt effect of co-extruded biaxial polypropylene films can be lastingly increased.

The ethylene-based copolymers or terpolymers used, which bear polar groups, are normally used as coupling agents in an interlayer in composite films to join two polymer layers which do not adhere to one another. In a composite such as this, the layer of coupling agent does not produce a high degree of haze.

As an additional component in a matt layer on the surface of the film they reduce gloss which is responsible inter alia for the matt appearance of the biaxially stretched films.

The formulations provided, to which the present invention also extends, lead to a distinct increase in the matt appearance in the event of biaxial stretching.

In addition, in biaxially stretched polypropylene film produced with a matt layer in accordance with the specified formulation, the layer thickness of the matt layer can be varied within wide limits without any change in the optical properties of the film. Even with layer thicknesses of <2 μm, matt films are obtained.

The film according to the invention preferably has an overall thickness of 10 to 40 μm.

The matt layer M is characterized in that it preferably has a thickness of 1 to 4 μm and consists of 40 to 70% polypropylene copolymers produced by block copolymerization, 5 to 12% of an ethylene-based copolymer or terpolymer modified with polar groups,
55 to 16% of a random copolymer of propylene and ethylene with an ethylene content of 2 to 6% by weight,
0 to 2% of a natural silica.

The core layer preferably has a thickness of 9 to 39 μm and consists of
97 to 100% of an isotactic polypropylene having a melt index of 0.5 to 8 g/10 mins. (230° C./21.2 N),
3 to 0% slip, antistatic and/or antiblocking agents.

The layers S either have a preferred thickness of 0.5 to 1.5 μm and consist of
97 to 100% of an isotactic polypropylene having a melt index of 0.5 to 8 g/10 mins. (230° C./21.2 N) or
a statistical propylene/ethylene copolymer containing 3 to 5% ethylene and having a melt index of 3 to 16 g/10 mins. (230° C./21.2 N) or
a statistical propylene/ethylene/butylene terpolymer having a comonomer content of <12% and a melt index of 3 to 16 g/10 mins. (230° C./21.2 N) and
3 to 0% slip, antistatic and/or antiblocking agents or have a preferred thickness of 3 to 15 μm and consist of
65 to 95% ethylene/vinyl acetate copolymers
10 to 35% ethylene/ethyl acrylate copolymers
8 to 30% ethylene/acrylic acid copolymers.

The films according to the invention may be used as adhesive or heat-lamination films for the graphic industry and as heat-sealable films for bag manufacture or for the manufacture of composite films.

In the following Examples, the following tests and processes are used to determine values and properties:

Gloss is determined in accordance with ASTM D 2457. In this case, it is the amount of light reflected at an angle of 45° in gloss units GU, based on a standard black glass mirror as 100 GU standard.

Haze is determined in accordance with ASTM D 1003. It is expressed in % and is the ratio of diffuse light transmission to total light transmission multiplied by 100.

Look through clarity is determined in accordance with ASTM D 1746. It is expressed in % and is the ratio of directed transmission with film to directed transmission without film multiplied by 100.

EXAMPLES

Substances used for the matt layers:

Polymer 1
PP/PE block copolymer
MFI* (230° C./21.2 N) 6 g/10 mins.
Melting point (DSC)* 164° C.
Modulus of elasticity (DIN 53457) 1550 N/mm$^2$ Polymer 2
PP/PE block copolymer
MFI* (230° C./21.2 N) 3 g/10 mins.
Melting point (DSC)* 162° C.
Modulus of elasticity (DIN 53457) 1300 N/mm$^2$ Polymer 3
PP/PE block copolymer
MFI* (230° C./21.2 N) 4 g/10 mins.
Melting point (DSC)* 169° C.
Modulus of elasticity (DIN 53457) 1000 N/mm$^2$ Polymer 4
PP/PE block copolymer
MFI* (230° C./21.2 N) 1.5 g/10 mins.
Melting point (DSC)* 155° C.
Modulus of elasticity (ASTM D 790) 1200 N/mm$^2$ Polymer 5
LDPE elastomer- and anhydride-modified
MFI* (230° C./21.2 N) 4.3 g/10 mins.
Melting point (DSC)* 104° C.

Polymer 6
Terpolymer of ethylene/butyl acrylate and maleic anhydride
MFI* (230° C./21.2 N) 15.6 g/10 mins.
Melting point (DSC)* 92° C.

Polymer 7
Terpolymer of ethylene/butyl acrylate and maleic anhydride
MFI* (230° C./21.2 N) 17.9 g/10 mins.
Melting point (DSC)* 104° C.

Polymer 8
LLDPE acid-modified
MFI* (230° C./21.2 N) 6.2 g/10 mins.
Melting (DSC)* 125° C.

Polymer 9
P/E random copolymer containing 1000 ppm SiO$_2$
MFI* (230° C./21.2 N) 4.7 g/10 mins.
Melting point (DSC)* 140° C.

Polymer 10
P/E/B random terpolymer
MFI* (230° C./21.2 N) 5 g/10 mins.
Melting point (DSC)* 130° C.

Polymer 11
Polyamide containing aliphatic, cycloaliphatic and aromatic basic units
Melting point (DSC)* 155° C.

*MFI=Melt flow index
*DSC=Differential scanning calorimetry

| Example | Composition of film Number of layers | Layer M of polymer Mixture | Mixing ratio | Layer K of polymer | Layer S of polymer | Gloss Matt side | Clarity | Haze |
|---|---|---|---|---|---|---|---|---|
| 1 | 3 | 2/5/10 | 60/10/30 | Polypropylene | Polypropylene | 10.4 | 0 | 67.6 |
| 2 | 2 | 1/6/9 | 60/10/30 | Polypropylene | — | 12.1 | 0 | 60.3 |
| 3 | 2 | 3/7/9 | 60/5/35 | Polypropylene | — | 14.8 | 0.1 | 49.1 |
| 4 | 2 | 2/6/10 | 40/10/50 | Polypropylene | — | 13.3 | 0.6 | 49.1 |
| 5 | 2 | 4/6/11 | 40/10/45/5 | Polypropylene | — | 12.5 | 0.1 | 61.3 |
| 6 | 2 | 3/7/9/12 | 40/10/45/5 | Polypropylene | — | 9.2 | 0.1 | 71.2 |
| 7 | 3 | 3/8/10 | 60/10/30 | Polypropylene | Propylene/ethylene | 13.8 | 0.2 | 56,7 |

-continued

| Composition of film Number of layers | Layer M of polymer Mixture | Mixing ratio | Layer K of polymer | Layer S of polymer | Gloss Matt side | Clarity | Haze |
| --- | --- | --- | --- | --- | --- | --- | --- |
| 8 | 3 | 3/5/9 | 60/10/30 | Polypropylene | random copolymer Ethylene/vinyl-acetate copolymer Ethylene/ethyl acrylate copolymer Ethylene/acrylic acid copolymer | 14.7 | 0.1 | 59.8 |
| Comparison Example | | | | | | | | |
| 1 | 2 | 2/10 | 60/40 | Polypropylene | — | 23.0 | 2.9 | 33.3 |
| 2 | 2 | 4/9 | 40/60 | Polypropylene | — | 26.8 | 5.6 | 29.7 |

EXAMPLE 1

A mixture of polymers 2/5/10 in a ratio of 60:10:30 is processed to a batch. This batch forms the matt layer and is co-extruded with a polypropylene layer which is substantially free from antiblocking agents, but contains slip and antistatic additives and with a second polypropylene layer treated with antiblocking agents. The film is then longitudinally stretched in a ratio of 1:3.5 to 1:5.5 and subsequently transversely stretched in a ratio of 1:7 to 1:10. On the non-matt side, the film is subjected to a corona pretreatment before winding. The film is 15 μm thick. The thicknesses of the individual layers are as follows: matt layer 2.5 μm±1 μm, first polypropylene layer 11 μm and second polypropylene layer 1.5 μm. The film is used for the adhesive lamination of printed products.

EXAMPLE 2

A matt layer of a mixture of polymers 1/6/9 in a ratio of 60:10:30 is co-extruded with a polypropylene layer containing antiblocking agents, antistatic agents and slip agents as additives. The film is then longitudinally stretched in a ratio of 1:3.5 to 5.5 and transversely stretched in a ratio of 1:7 to 1:10. On the non-matt side, the film is subjected to a corona pretreatment before winding. The film is 12 μm thick. The matt layer has a thickness of 2.5 μm ±1 μm. The film is used for the adhesive lamination of printed products.

EXAMPLE 3

As Example 2—but with polymer mixture 3/7/9 in a ratio of 60:5:35 for the matt layer.

EXAMPLE 4

As Example 2—but with polymer mixture 2/6/10 in a ratio of 40:10:50 for the matt layer.

EXAMPLE 5

As Example 2—but with polymer mixture 4/6/9/11 in a ratio of 40:10:45:5 for the matt layer.

EXAMPLE 6

As Example 2—but with polymer mixture 3/7/9/12 in a ratio of 40:10:45:5 for the matt layer.

EXAMPLE 7

A matt layer of a mixture of polymers 3/8/10 in a ratio of 60:10:30 is coextruded with a polypropylene layer which is substantially free from additives and a sealing layer of polymer 10 with typical additives, such as antiblocking agents, antistatic agents and slip agents. The film is then longitudinally stretched in a ratio of 1:3.5 to 1:5.5 and transversely stretched in a ratio of 1:7 to 1:10. It is subjected to corona pretreatment on at least one side before winding. The film has a total thickness of 20 μm, the matt layer being 2.5 μm±1 μm thick, the polypropylene layer 16.4 μm thick and the sealing layer 1.1 μm thick. This film is suitable inter alia for printing, bag manufacture on horizontal and vertical tubular bag machines and in printed and unprinted form as a starting film for various composite films.

EXAMPLE 8

A matt layer of a mixture of polymers 3/5/9 in a ratio of 60:10:30 is coextruded with a polypropylene layer which is substantially free from antiblocking agents, but contains slip and antistatic additives and then longitudinally stretched in a ratio of 1:3.5 to 1:5.5. A heat-laminatable layer is then applied by lamination or extrusion, as described in EP 0 424 761 A2. In the preferred embodiment, mixtures of 65 to 95 parts by weight ethylene/vinyl acetate copolymer 10 to 35 parts by weight ethylene/ethyl acrylate copolymer 8 to 20 parts by weight ethylene/acrylic acid copolymer are used for this layer. After application of the heat-laminatable layer, the film is transversely stretched in a ratio of 1:7 to 1:10.

The heat-laminatable film thus produced has an overall thickness of 22 μm, the matt layer being 2.5 μm thick, the polypropylene layer 12.5 μm thick and the heat-laminatable layer 7 μm thick. The film is used for finishing printed products for the graphic industry.

COMPARISON EXAMPLE 1

As Example 2—but with polymer mixture 2/10 in a ratio of 60:40 for the matt layer

COMPARISON EXAMPLE 2

As Example 2—but with polymer mixture 4/9 in a ratio of 40:60 for the matt layer.

We claim:
1. A matt-effect, biaxially stretched polypropylene film with at least two layers which comprises an outer matt layer M, a core layer K and optionally at least one layer S wherein
matt layer M has a thickness of 0.5 to 5.0 μm and comprises:
30 to 70% of at least one polypropylene/polyethylene block copolymer;

2 to 18% of an ethylene-based copolymer or terpolymer modified with polar groups;

68 to 2% of a statistical copolymer comprises of propylene/ethylene/butylene with propylene as the primary component;

0 to 5% of a polyamide; and 0 to 5% of a natural synthetic silica, core layer K consists of a thermoplastic polymer or copolymer of propylene optionally with slip, antistatic or antiblocking agents, and optional layer S which adjoins the core layer K on the opposite side of the matt layer wherein said layer consists of a thermoplastic polypropylene layer optionally with slip, antistatic, or antiblocking agents;

a thermoplastic statistical copolymer layer of polypropylene with one or more α-olefins containing 2 to 6 carbon atoms optionally with slip; antistatic, or blocking agents;

a hot-laminated layer comprising mixtures of ethylene-based copolymers; or a layer which combines the above-mentioned layers, the film having been produced by co-extruding the film;

cooling said film slowly after it leaves the flat film die so that the matt layer undergoes slow cooling;

reheating said film to approximately 100° to 130° C. and longitudinally stretching said film in a ratio of 1:3 to 1:7;

traversely stretching said film in a ratio of 1:7 to 1:12 at a temperature of 150° to 180° C.;

heat-setting the film before it leaves the stretching tunnel; and subjecting said film on at least one side to either a corona discharge or to a flame pre-treatment before winding it into rolls.

2. A film according to claim 1, wherein a second matt layer M is applied to the core layer K or to layer S.

3. A film according to claim 1, wherein layer S is a thermoplastic polypropylene layer.

4. A three or four layer film according to claim 1, wherein after the longitudinal stretching step, the matt layer M, the core layer K and the optional layer S are:

subjected to two layer or three-layer co-extrusion after longitudinal stretching, laminated or extrusion coated with another layer between leaving the longitudinal stretching zone ana entering the transverse stretching zone, transversely stretching the resulting film laminate in a ratio of 1:7 to 1:12, and subjecting said film to heat setting and corona treatment or to flame pretreatment.

5. A polymer mixture for producing a matt layer and which comprises:

30 to 70% of at least one polypropylene/polyethylene block copolymer;

2 to 18% of an ethylene-based copolymer or a terpolymer modified with polar groups;

68 to 2% of a statistical copolymer or terpolymer comprised of propylene/ethylene/butylene with propylene as the principal component;

0 to 5% of a polyamide; and 0 to 5% of a natural and synthetic silica.

* * * * *

UNITED STATES PATENT AND TRADEMARK OFFICE
CERTIFICATE OF CORRECTION

PATENT NO. : 5,425,990
DATED : June 20, 1995
INVENTOR(S) : Blum, et al.

It is certified that error appears in the above-indentified patent and that said Letters Patent is hereby corrected as shown below:

Col. 10, line 15   After " layer " insert -- $S_2$ --

Col. 10, line 17   Delete " ana " and substitute -- and --

Signed and Sealed this

Nineteenth Day of September, 1995

Attest:

BRUCE LEHMAN

*Attesting Officer*       *Commissioner of Patents and Trademarks*